(12) United States Patent
Sherman (10) Patent No.: US 8,466,399 B1
(45) Date of Patent: Jun. 18, 2013

(54) TECHNIQUES FOR ADJUSTING SOLAR ARRAY TRACKING

(75) Inventor: James Sherman, Hillsborough, NJ (US)

(73) Assignee: Suncore Photovoltaics, Inc., Irwindale, CA (US)

( * ) Notice: Subject to any disclaimer, the term of this patent is extended or adjusted under 35 U.S.C. 154(b) by 383 days.

(21) Appl. No.: 12/830,926

(22) Filed: Jul. 6, 2010

Related U.S. Application Data (63) Continuation-in-part of application No. 12/619,322, filed on Nov. 16, 2009, and a continuation-in-part of application No. 12/498,135, filed on Jul. 6, 2009, and a continuation-in-part of application No. 12/468,747, filed on May 19, 2009, now Pat. No. 8,193,477, and a continuation-in-part of application No. 12/258,253, filed on Oct. 24, 2008, now Pat. No. 7,795,568.

(51) Int. Cl.
  *H01L 31/042* (2006.01)

(52) U.S. Cl.
  USPC ......... 250/203.4; 136/246; 136/291; 136/244

(58) Field of Classification Search
  USPC ..................... 250/203.3, 203.4; 136/206, 243, 136/246, 252, 291, 244
  See application file for complete search history.

(56) References Cited

U.S. PATENT DOCUMENTS

| | | | |
|---|---|---|---|
| 4,031,385 A | 6/1977 | Zerlaut et al. | |
| 4,172,739 A | 10/1979 | Tassen | |
| 4,345,582 A | 8/1982 | Aharon | |
| 4,425,904 A | 1/1984 | Butler | |
| 4,585,318 A | 4/1986 | Seifert | |
| 4,832,001 A | 5/1989 | Baer | |
| 4,989,124 A | 1/1991 | Shappell | |
| 5,169,456 A | 12/1992 | Johnson | |
| 5,228,924 A | 7/1993 | Barker et al. | |
| 5,600,124 A | 2/1997 | Berger | |
| 5,798,517 A | 8/1998 | Berger | |
| 6,058,930 A | 5/2000 | Shingleton | |
| 6,123,067 A | 9/2000 | Warrick | |

(Continued)

FOREIGN PATENT DOCUMENTS

| | | |
|---|---|---|
| JP | 2000196127 | 7/2000 |
| JP | 2000223730 | 8/2000 |

(Continued)

OTHER PUBLICATIONS

U.S. Appl. No. 12/791,580, filed Jun. 1, 2010, Kats et al.

(Continued)

*Primary Examiner* — Tony Ko
(74) *Attorney, Agent, or Firm* — Mueting, Raasch & Gebhardt, P.A.

(57) ABSTRACT

An automated method to monitor performance and adjust the programmed motion of a terrestrial solar cell array tracking the sun. The solar cell system includes two motor drives that adjust a position of the array along different respective axes with respect to the sun. A software algorithm predicts the position of the sun during the course of the day, and a kinematic model with adjustable encoding parameters controls the motor drives. Sampled data taken periodically may be used to update and modify the encoding parameters of the kinematic model in order to improve accuracy of the position of the array as it moves during the course of the day due to changes in mechanical or foundational positions supporting the array that may occur over the course of time.

20 Claims, 9 Drawing Sheets

U.S. PATENT DOCUMENTS

| | | | |
|---|---|---|---|
| 6,465,725 | B1 | 10/2002 | Shibata et al. |
| 6,552,257 | B1 | 4/2003 | Hart et al. |
| 6,563,040 | B2 | 5/2003 | Hayden et al. |
| 6,960,717 | B2 | 11/2005 | Stuart et al. |
| 7,109,461 | B2 * | 9/2006 | Lasich ................ 250/203.4 |
| 7,252,084 | B2 | 8/2007 | Pawlenko et al. |
| 7,381,886 | B1 | 6/2008 | Aiken et al. |
| 7,795,568 | B2 | 9/2010 | Sherman |
| 2003/0066555 | A1 | 4/2003 | Hui et al. |
| 2004/0112373 | A1 | 6/2004 | Djeu |
| 2007/0089777 | A1 | 4/2007 | Johnson, Jr. et al. |
| 2007/0101738 | A1 | 5/2007 | Akei et al. |
| 2007/0188876 | A1 | 8/2007 | Hines et al. |
| 2007/0193620 | A1 | 8/2007 | Hines et al. |
| 2008/0128586 | A1 | 6/2008 | Johnson et al. |
| 2008/0135087 | A1 | 6/2008 | Anikara |
| 2008/0178867 | A1 | 7/2008 | DiDomenico |
| 2008/0258051 | A1 | 10/2008 | Heredia et al. |
| 2008/0290252 | A1 | 11/2008 | Leonhardt et al. |
| 2009/0000662 | A1 | 1/2009 | Harwood et al. |
| 2009/0032014 | A1 | 2/2009 | Meydbray |
| 2009/0032084 | A1 | 2/2009 | Aiken et al. |
| 2009/0032086 | A1 | 2/2009 | Kats et al. |
| 2009/0126774 | A1 * | 5/2009 | Taylor et al. .................. 136/244 |
| 2009/0179139 | A1 | 7/2009 | Hines et al. |
| 2010/0011565 | A1 | 1/2010 | Zawadzki et al. |
| 2010/0018570 | A1 | 1/2010 | Cashion et al. |
| 2010/0023138 | A1 | 1/2010 | McDonald et al. |
| 2010/0032004 | A1 | 2/2010 | Baker et al. |
| 2010/0101625 | A1 | 4/2010 | Kats et al. |
| 2010/0101630 | A1 | 4/2010 | Kats et al. |
| 2010/0101632 | A1 | 4/2010 | Kats et al. |
| 2010/0102200 | A1 | 4/2010 | Kats et al. |
| 2010/0102201 | A1 | 4/2010 | Sherman |
| 2010/0102202 | A1 | 4/2010 | Sherman |
| 2010/0108860 | A1 | 5/2010 | Sherman et al. |
| 2010/0294337 | A1 | 11/2010 | Sherman et al. |

FOREIGN PATENT DOCUMENTS

| | | |
|---|---|---|
| JP | 2002202817 | 7/2002 |
| JP | 2002202817 A | 7/2002 |
| WO | 02079793 A1 | 10/2002 |
| WO | 2008/008023 A1 | 1/2008 |
| WO | 2009048879 A2 | 4/2009 |

OTHER PUBLICATIONS

U.S. Appl. No. 12/828,734, filed Jul. 1, 2010, Kozin.

U.S. Appl. No. 12/830,926, filed Jul. 6, 2010, Sherman.

Picture of GG Concentrator Array, Circa 1983, Sandia.

Luque, A. and Hegedus, S., eds. Handbook of Photovoltaic Science and Engineering. Wiley: Hoboken, NJ. 2003. Sections 9.8 and 9.9 and Chapter 11. 64 pages total. ISBN 1591247748. Ebook accessed through North Carolina State University Libraries. http://catalog.lib.ncsu.edu/web2/tramp2.exe/goto/A1hl1rgj.002?screen?Record.html&server=1home&item=3.

"Concentrating PV module and system developers." Photon International: The Photovoltaic Magazine. Aug. 2009. pp. 134-137. Photon Europe GmbH, Aachen, Germany.

"WS T 1600—the world wide connected solar tracker." Data Sheet, 2 pages. www.ws-energia.com. WS Energia Lda, Oeiras, Portugal.

"WS T 1600—the world wide connected solar tracker." Data Sheet, 3 pages. www.ws-energia.com. WS Energia Lda, Oeiras, Portugal.

WST1000. Data Sheet, 2 pages. www.ws-energia.com. Ws Energia Lda, Oeiras, Portugal.

"170 Watt NE-170UC1." Data Sheet, 2 pages. Sharp.co.jp. Sharp Electronics Corp., Huntington Beach, CA.

OPEL SF-4M Roof Top Tracker. Data Sheet, 2 pages. www.opelinc.com. OPEL Solar Inc. Shelton, CT.

"FEiNA SF-4 Mini Tracker." Data Sheet, 2 pages. www.opelinc.com. OPEL Solar Inc. Shelton, CT.

SF-40 H1 Rooftop Tracker. Data Sheet, 2 pages. www.opelinc.com. OPEL Solar Inc. Shelton, CT.

"OPEL TF-800 Single Axis Tracker." Data Sheet, 2 pages. www.opelinc.com. OPEL Solar Inc. Shelton, CT.

"FEiNA SF-9 Dual Axis Tracker." Data Sheet, 2 pages. www.opelinc.com. OPEL Solar Inc. Shelton, CT.

"FEiNA SF-20 Dual Axis Tracker." Data Sheet, 2 pages. www.opelinc.com. OPEL Solar Inc. Shelton, CT.

"OPEL SF-20 CPV Dual Axis Tracker." Data Sheet, 2 pages. www.opelinc.com. OPEL Solar Inc. Shelton, CT.

"TF-500 Dual Axis Tracker." Data Sheet, 2 pages. www.opelinc.com. OPEL Solar Inc. Shelton, CT.

"MK-Id High Concentration Photovoltaic Panel (HCPV)." Data Sheet, 2 pages. www.opelinc.com. OPEL Solar Inc. Shelton, CT.

"PS140 Solar Concentrator." Data Sheet, 2 pages. www.power-spar.com. Power-Spar, Markham, Ontario, Canada.

Fraas, L., et al., "Start-Up of First 100 kW System in Shanghai with 3-Sun PV Mirror Modules." 4 pages. Presented at 4th International Conference on Solar Concentrators for the Generation of Electricity or Hydrogen (ICSC-4), San Lorenzo del Escorial, Spain, Mar. 12-16, 2007. Jxcrystals.com. JX Crystals, Inc., Issaquah, WA.

Fraas, L., et al., "Test Sites and Testing of 3-Sun Mirror Modules." 4 pages. Presented at IEEE 4th World Conference on Photovoltaic Energy Conversion, Waikoloa, Hawaii, May 9, 2006. Jxcrystals.com. JX Crystals, Inc., Issaquah, WA.

"SunCube Specifications." Data Sheet, 4 pages. www.greenandgoldenergy.com.au. Green and Gold Energy Pty. Ltd., Glynde, Australia.

"Sunflower Fully-Integrated, Smart HCPV." Data Sheet, 2 pages. www.energyinnovations.com. Energy Innovations, Poway, CA.

"Kinematics slewing drives" Product description. 1 page. www.kinematicsmfg.com/Products/slewing-drives.aspx. Kinematics Manufacturing, Inc. Phoenix, AZ.

"Slewing Drives S7b-73m-32ra." Data Sheet, 2 pages. www.kinematicsmfg.com/Products/slewing-drives/SlewingDrivesProducts/Slewing-Drives-S7B-73M-32RA.aspx. Kinematics Manufacturing, Inc. Phoenix, AZ.

"Laser welding of plastics. Innovative and flexible." Brochure. http://www.leister.com/uploads/pdf/en/leister_laser_eng.pdf. Sep. 2007. Leister Process Technologies. Kaegiswil, Switzerland. (12 pages).

"GLOBO-welding. Laser welding of plastics—innovative and flexible. The universal processing concept for 3D and continuous applications." Brochure. http://www.leister.com/uploads/pdf/en/BRO_GLOBO_Welding_dv092006_ENG.pdf. Sep. 2006. Leister Process Technologies. Kaegiswil, Switzerland. (4 pages).

"Shop SABRE, a N.A.C.S.I Company. 'The Way CNC Was Meant to Be.'" Laser Product Information. http://www.shopsabre.com/Laser%20Page.html. No date of web publication given. Shop SABRE. Elko, Minnesota, USA. (4 pages).

"Combined Search and Examination Report," application No. GB0918669.3. Feb. 17, 2010. Intellectual Property Office, Newport, South Wales, UK.

* cited by examiner

TECHNIQUES FOR ADJUSTING SOLAR ARRAY TRACKING

CROSS-REFERENCE TO RELATED APPLICATIONS

This application is a continuation in part of U.S. patent application Ser. No. 12/619,322, filed Nov. 16, 2009; Ser. No. 12/498,135 filed Jul. 6, 2009; Ser. No. 12/468,747 filed May 19, 2009 now U.S. Pat. No. 8,193,477, and Ser. No. 12/258,253 filed on Oct. 24, 2008 now U.S. Pat. No. 7,795,568, the disclosures of each of which are hereby expressly incorporated herein by reference.

TECHNICAL FIELD

This disclosure relates to solar tracking for terrestrial solar cell arrays and more particularly to techniques for adjusting the programmed parameters controlling motion of individual arrays so that the track of the arrays during the course of a day is more accurately aligned with the sun.

BACKGROUND

In solar tracking systems, generally one or more terrestrial solar cell arrays track the motion of the sun and convert sunlight into electrical energy. Accurate solar tracking is necessary because the amount of power generated by a given solar cell is related to the amount of sunlight that impinges on that solar cell. This is a particular concern for a concentrating solar cell array which uses lenses to focus sunlight onto respective solar cells because a tracking misalignment of less than one degree can substantially reduce the amount of sunlight impinging on the solar cells and hence the power output of the solar cells. Solar tracking is achieved by properly orientating the array relative to the sun at an initial time instant at the beginning of the day and then using motors and actuators to move the array (e.g., in roll and pitch or in azimuth and elevation directions, depending upon the type of array) along a predetermined path that properly tracks movement of the sun. However, from time to time deviations may still occur from accurate alignment of the solar array with the sun.

SUMMARY OF THE INVENTION

Briefly, and in general terms, the present invention provides an automated method of causing a photovoltaic solar cell array of a terrestrial solar cell system to track the sun, the system comprising two motor drives each of which is operable to adjust a position of the array along a different respective axis with respect to the sun, the method comprising: (a) using a software algorithm to predict a position of the sun at a time after sunrise based, at least in part, on latitude, longitude and elevation; (b) using a computer kinematic model to determine respective actuations for the motor drives corresponding to the solar cell array being substantially aligned with the sun during the course of the day; (c) using the software algorithm and the kinematic model to position the array so that the array follows a predetermined path to track the sun during the course of the day; (d) periodically sampling the output of the array at sun position p and resetting the position of the array to a new sun position p that increases the output of the array; (e) storing the sequence of new sun positions in a memory; (f) adjusting the parameters of the kinematic model to form a list of test kinematic models over the range of sun positions; (g) evaluating each of the test kinematic models against a predetermined evaluation criteria as they simulate a progression through the range sun positions during the course of the day; (h) selecting one of the test kinematic model that best meets the evaluation criteria; and (i) modifying the operational kinematic model of the array to conform to the parameters of the selected test kinematic model, so that subsequently the motion of the array at predetermined times during the course of the day tracks the set of reset positions with maximum output.

In another aspect, the present invention provides an automated method to monitor performance and adjust the programmed motion of a terrestrial solar cell array tracking the sun. The solar cell array includes two motor drives that adjust a position of the array along different respective axes with respect to the sun. A software algorithm predicts the position of the sun during the course of the day, and a kinematic model with adjustable encoding parameters controls the motor drives so that the array follows the predicted track of the sun. Stored sampled data is used to update and modify the encoding parameters of the kinematic model in order to modify or change the track of the array as it moves away from the actual sun position or track during the course of the day due to misalignment that may occur over the course of time.

Some implementations of the present invention may incorporate or implement fewer of the aspects and features noted in the foregoing summaries.

Additional aspects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF DRAWINGS

The invention will be better and more fully appreciated by reference to the following detailed description when considered in conjunction with the accompanying drawings, wherein.

DETAILED DESCRIPTION

Details of the present invention will now be described including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

Figure 1:
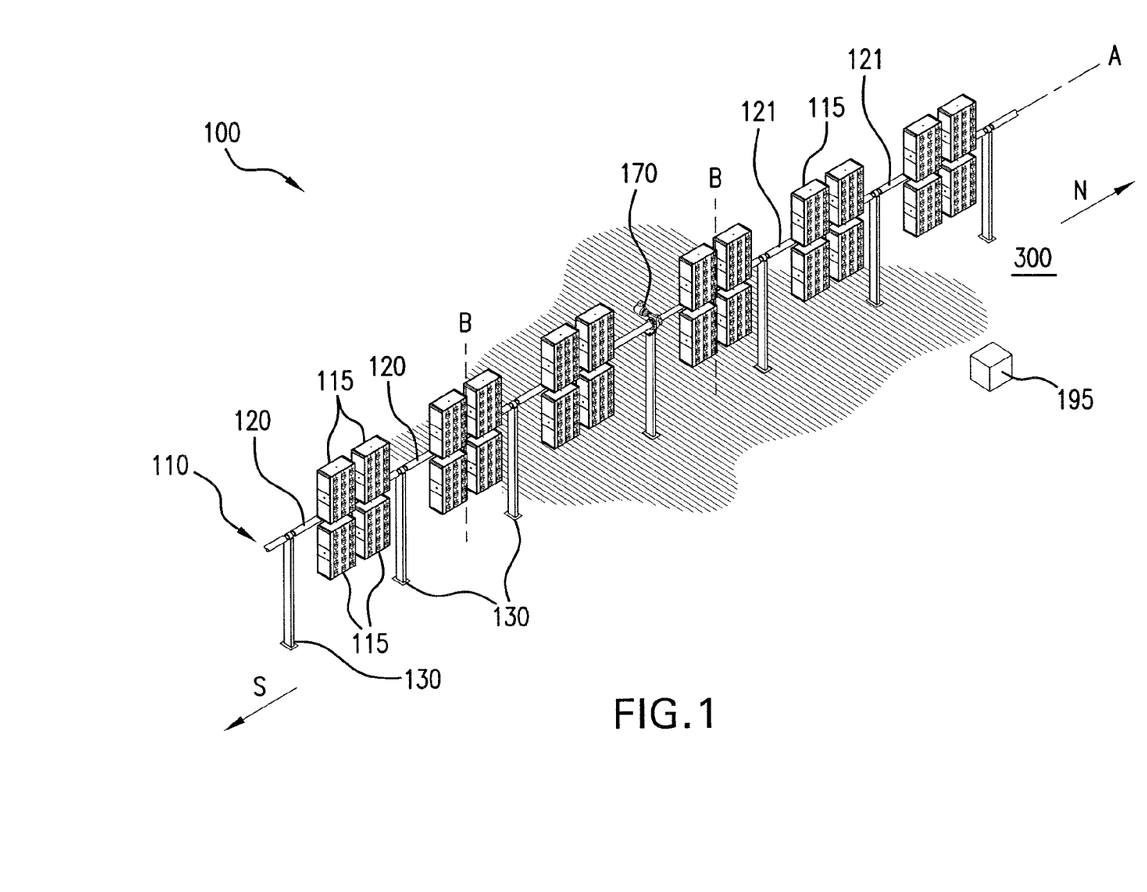
FIG. 1 illustrates an array or row of mounted solar cell modules which track the position of the sun during the day.
Figure 2:
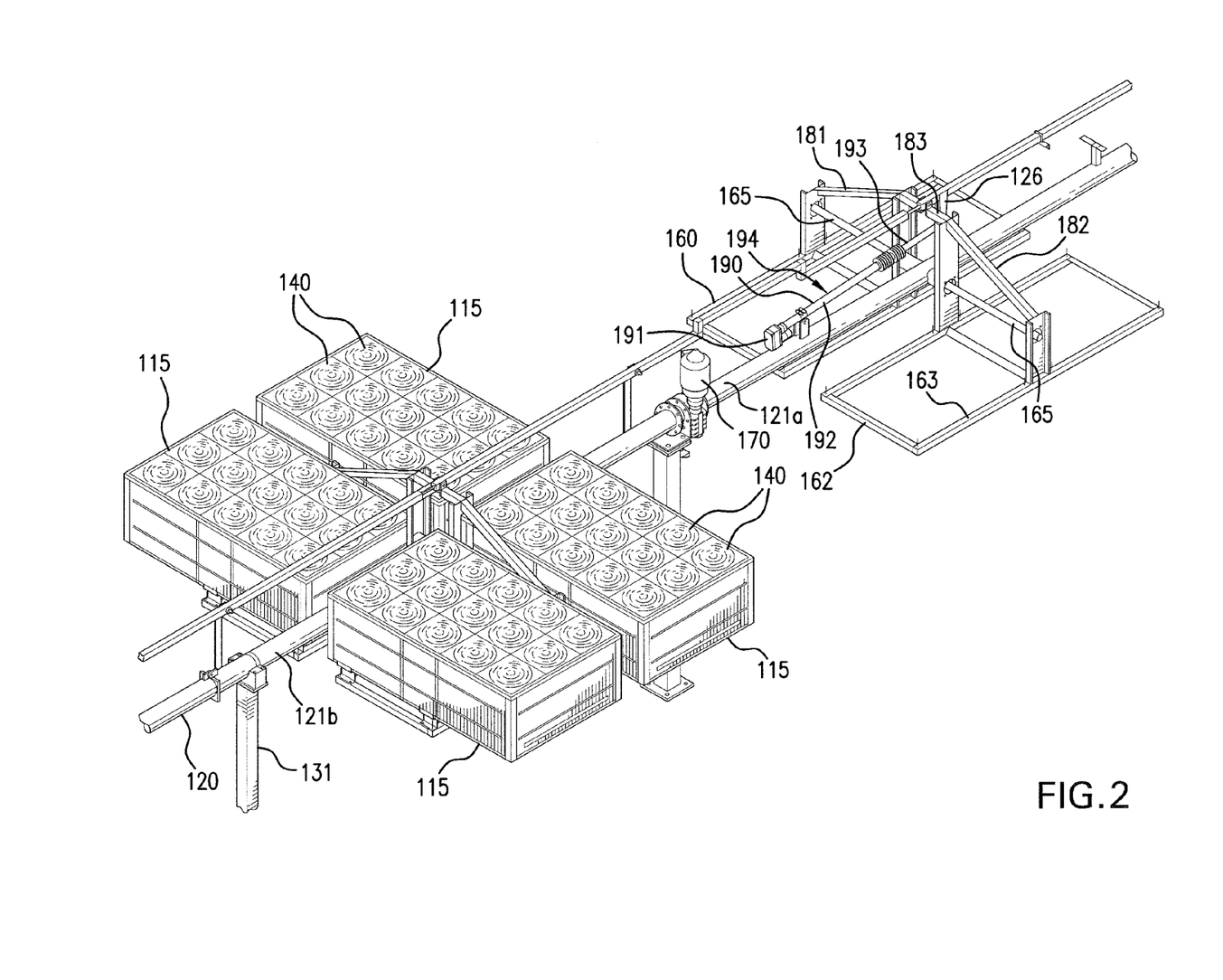
FIG. 2 illustrates a portion of the array from FIG. 1, illustrating the motor drives for adjusting a roll position and a pitch position of the solar cell modules of the array.
Figure 3:
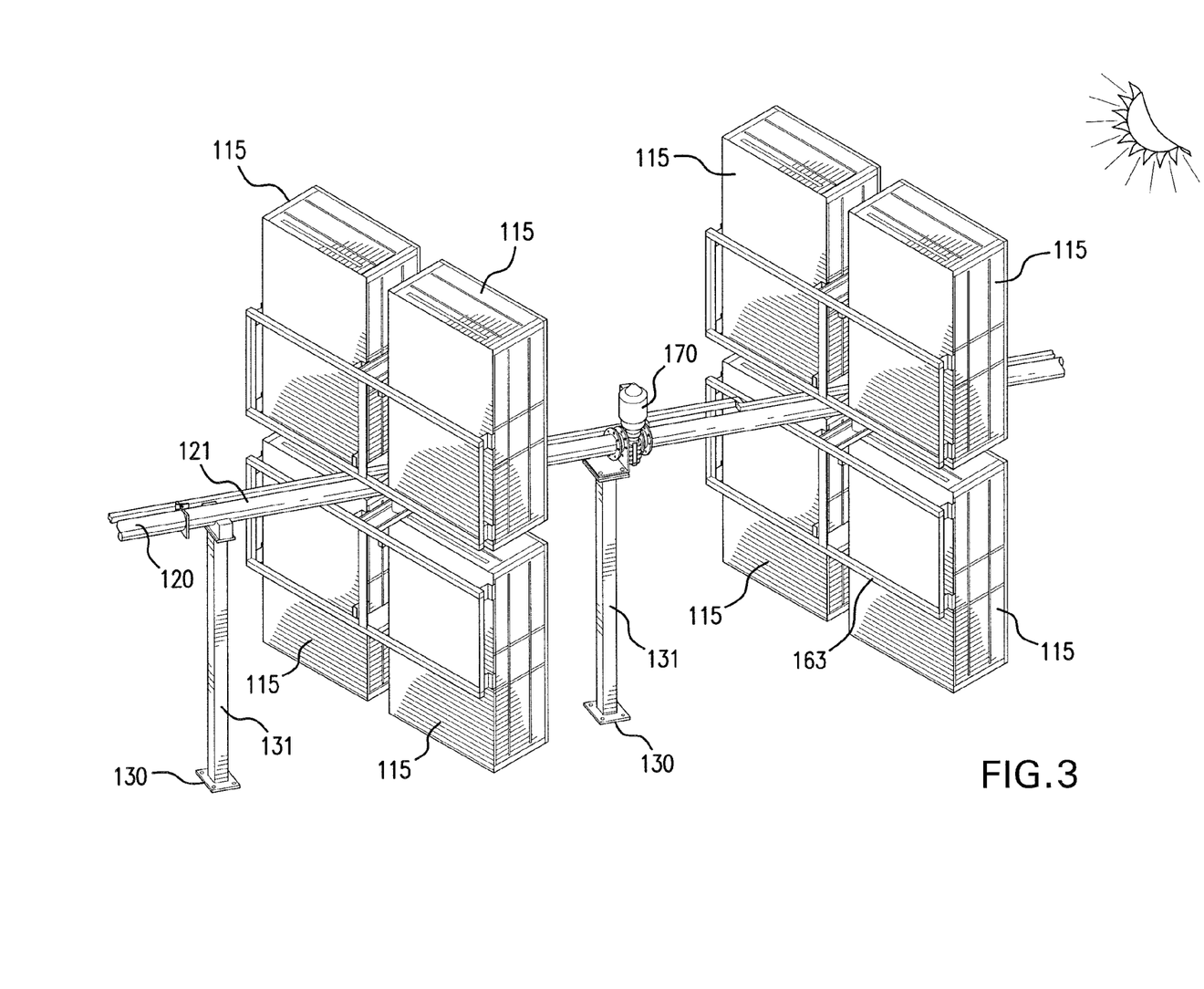
FIG. 3 illustrates the portion of the array of FIG. 2, illustrating the position of the solar cell modules of the array as they face the sun.

An exemplary embodiment of a concentrator terrestrial solar power system is illustrated in FIGS. 1 to 3, which illustrate a solar cell array 100 configured as a mechanically coupled linearly aligned group of solar cell subarrays each capable of simultaneous motion for tracking the sun throughout the day. In some embodiments, each solar cell subarray section or cluster comprises four individual solar cell modules 115, with each solar cell module 115 including a generally rectangular subarray or matrix of solar cell subassemblies. In this embodiment, each solar cell module includes a housing comprising a first side and an opposing spaced-apart second side; a plurality of lenses 140 on the first side of the housing; a plurality of solar cell receivers on the second side of the housing, each of the plurality of solar cell receivers comprising a III-V compound semiconductor multijunction solar cell including a first surface and a second surface. A heat sink is positioned below the second surface of the solar cell and thermally coupled to the solar cell. An optical element may be positioned above the first surface to guide the light from the respective lens onto the solar cell. In some embodiments, each of the solar cell receivers is disposed in an optical path of a respective one of the plurality of lenses, so that the lens and the at least one optical element concentrate the light onto the respective solar cell by a factor of 500 or more. As a result, on full illumination under such concentration, the respective solar cell may generate in excess of 25 watts of peak DC power. U.S. patent application Ser. No. 12/582,047, filed Oct. 20, 2009, is hereby incorporated by reference to describe and depict the module 115 in greater detail.

In other embodiments, the solar arrays may be non-concentrator photovoltaic systems, such as flat panels of planar solar cells. In some embodiments, the solar cells 310 may be made from, e.g., silicon (including amorphous, nanocrystalline, or protocrystalline), cadmium telluride, CIGS (copper indium gallium diselenide), CIS (chalcopyrite films of copper indium selenide ($CuInSe_2$)), gallium arsenide (e.g., GaAs multijunctions), light absorbing dyes (e.g., ruthenium metalorganic dye), or organic semiconductors (e.g., polyphenylene vinylene, copper phthalocyanine or carbon fullerenes).

In one embodiment, the module 115 includes a plurality of rectangular concentrator lenses 140 (in this embodiment a Fresnel lens) which, when properly aligned, focus sunlight onto a respective solar cell receiver including a triple-junction III-V compound semiconductor solar cell.

The amount of power generated by the array is directly related to the amount of sunlight impinging upon the constituent solar cells. It is advantageous, therefore, to arrange the concentrating lenses 140 of the solar cell devices such that when the plane of the concentrator lenses 140 is orthogonal to the incoming rays of the sun, the concentrating lenses 140 direct impinging sunlight onto their corresponding solar cells so that power generation is maximized. To that end, a solar tracking mechanism is employed that ensures that the plane of concentrator lenses 140 results in a sun beam being projected on the center of the respective solar cells in a continuous manner as the sun traverses the sky during the day, thereby optimizing the amount of sunlight impinging upon the solar cells. As will be discussed in more detail hereafter, to verify and maintain correct alignment with the sun, the terrestrial solar power system is also designed to perform an alignment test at periodic intervals, and make adjustment to the actuating kinematic model which drives the motors that position the array.

Figure 4:
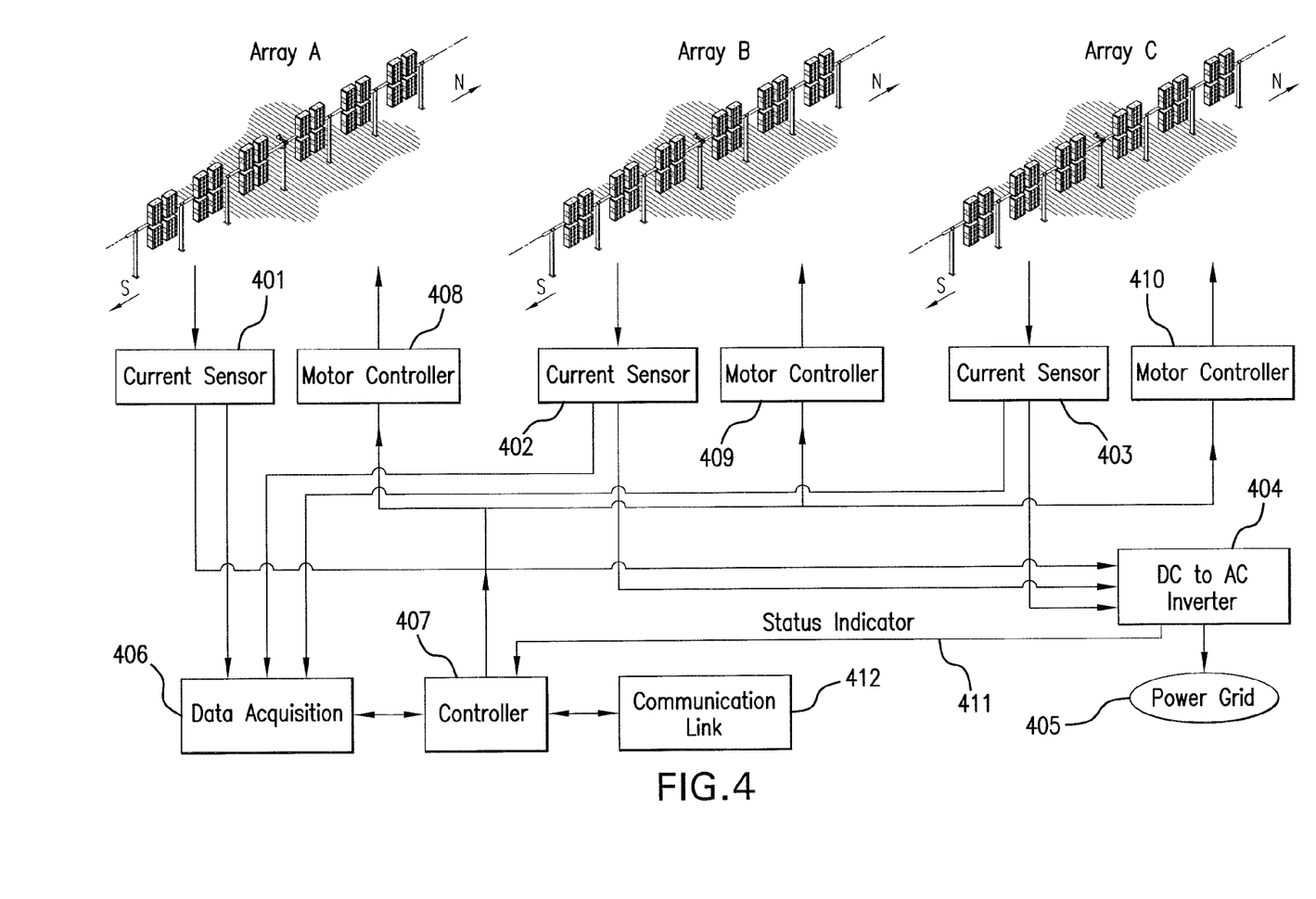
FIG. 4 illustrates three rows of solar cell arrays and a block diagram of a power and control system.

While only a single row of solar cell arrays is shown in FIG. 1, the solar tracking and alignment testing techniques discussed herein may be implemented on solar cell array fields or farms that are formed of discrete rows of solar cell arrays, each operating independently, in full unison, or in partial unison during solar tracking, as shown in FIG. 4.

FIG. 1 illustrates an embodiment of an assembled solar array generally illustrated as element 100. The array 100 includes an elongated frame 110 with a torque tube 120 configured to mount various numbers of solar cell modules 115. The frame 110 is able to rotate each of the solar cell modules 115 along a first axis A to simultaneously track the elevation of the sun during the course of a day. The frame 110 also rotates each solar cell module 115 along axes B that are substantially perpendicular to axis A to track the azimuthal position of the sun during the course of the day. The frame 110 also includes vertical supports 130 spaced along the length of the torque tube 120 to position the torque tube 120 above the surface of a supporting surface 300.

The array 100 is constructed from two or more discrete sections 121 that are assembled together. Each section 121 forms a portion of the torque tube 120 and one or more solar cell modules 115. The sections 121 are connected together to allow rotation of the solar cell modules 115 about each of the first and second axes A, B.

The modular design provides for a user to construct the frame 110 to a size that supports a necessary number of solar cell modules 115. Each of the sections 121 may include the same or different sizes, numbers, and configurations of solar cell modules 115. Additional sections 121 may be added to a frame 110 of an existing solar array 100 to accommodate additional solar cell modules 115 as is necessary to increase the power output of the array 100.

The torque tube 120 includes an elongated shape with a length to accommodate the required number of solar cell modules 115. The torque tube 120 is constructed of a number of separate sections 121 that are attached together in an end-to-end orientation in a collinear manner. Each of the sections 121 may have the same physical characteristics (e.g., length, diameter, shape, weight), or one or more of the sections 121 may include different characteristics. According to some embodiments of the present invention, the solar array 100 includes two different types of sections 121: a first section 121a that includes a linear actuator 190; and a second section 121b that does not include the linear actuator 190. According to some embodiments of the present invention, the solar array 100 includes a single first section 121a, and two or more second sections 121b. In one specific embodiment, the sections 121 are each hollow pipes with a diameter of about 4 inches, a thickness of about 0.167 inches, a length of about 192", and a weight of about 110 lbs.

As illustrated in FIG. 2, mounts 160 are connected to the torque tube 120 and support the solar cell modules 115. According to some embodiments of the present invention, each section 121 includes at least one mount 160 to support at least one solar cell module 115. The mounts 160 may include vertical members 162 that are perpendicular to the torque tube 120, and horizontal members 163 that are parallel to the torque tube 120. Mounts 160 may be of different sizes to accommodate different numbers of solar cell modules 115. Mounts 160 may also include a pivot member 165 that facilitates pivoting motion of the solar cell modules 115 about the second axes B. The pivot member 165 may be a single elongated member or may be constructed of separate members that are positioned in an end-to-end orientation and connected at the torque tube 120. Supports 181, 182, 183 extend between an outer extent of the mounts 160 away from the torque tube 120 and a linkage 150 that extends along the torque tube 120. The supports 181, 182, 183 facilitate rotation of the mount 160 and attached solar cell modules 115 about one of the axes B as will be explained in more detail below.

The mounts 160 may be positioned at various spacings along the length of the torque tube 120. The mounts 160 may be aligned along the torque tube 120 in offsetting pairs on opposing sides of the torque tube 120 directly across from one another as illustrated in FIGS. 1 and 2. Other offset positioning may include the mounts 160 unevenly spread along the length with equal numbers of mounts 160 extending outward from each opposing side of the torque tube 120. The offset positioning assists to balance the array 100 and facilitate rotation about the first axis A. Other configurations may include uneven numbers of mounts 160 extending outward from the opposing sides of the torque tube 120. According to some embodiments, a single solar cell module 115 extends from each section 121 of the torque tube 120.

The vertical supports 130 are spaced apart along the length of the torque tube 120 to position the solar cell modules 115 above the surface 300 for rotation about the first axis A. The vertical supports 130 include a vertical post 131 and a base 132. The vertical posts 131 include a length greater than the solar cell modules 115 for rotation about axis A. The bases 132 include an enlarged area that is greater than the posts 131 and are configured to contact against the surface 300. In one specific embodiment, the vertical posts 131 include a 4 inch by 4 inch rectangular shape with a thickness of about 0.188 inches, and the bases 132 include an enlarged area and are supported by a concrete pad.

The vertical supports 130 are positioned along the torque tube 120 away from the mounts 160 to prevent interference with the movement of the solar cell modules 115. As illustrated in FIG. 1, the vertical supports 130 are spaced-apart from the solar cell modules 115 along the length of the torque tube 120. In this arrangement, the vertical supports 130 are in a non-overlapping arrangement with the solar cell modules 115. Various numbers of vertical supports 130 may be positioned along the length of the torque tube 120. According to some embodiments of the present invention, at least one vertical support 130 is connected to each discrete section 121 of the torque tube 120. In the embodiment of FIG. 1, a vertical support 130 is positioned between each pair of mounts 160. In other embodiments, the vertical supports 130 are spaced a greater distance apart along the torque tube 120.

One or more drives 170 are connected to the torque tube 120 to provide a force to rotate the torque tube 120 about axis A. According to some embodiments of the present invention, a single drive 170 rotates the torque tube 120 and is positioned at an end of the torque tube 120. Another embodiment includes a single drive 170 centrally located along the torque tube 120. Other embodiments include multiple drives 170 positioned along the length of the torque tube 120. The drives 170 may include a drive train with one or more gears that engage with the torque tube 120. Additional details about embodiments of the drive 170 are included below.

The array 100 is designed to balance the power load requirements of the one or more drives 170 during rotation through the various angular positions about the first axis A. One manner of balancing the load requirements is placing the mounts 160 and solar cell modules 115 such that a center of gravity of the array 100 is aligned with the torque tube 120. FIG. 1 illustrates an example of this positioning with equal numbers of solar cell modules 115 extending outward from the opposing sides of the torque tube 120. FIG. 1 illustrates the solar cell modules 115 aligned in pairs that are directly across the torque tube 120 from each other. Other spacings of the mounts 160 and solar cell modules 115 may also be used for balancing the load requirements. The balanced array 100 maintains a near constant potential energy as rotation in a first direction is facilitated by the weight of the solar cell modules 115 that extend outward from a first side, and rotation in a second direction is facilitated by the opposing solar cells 115 that extend outward from a second side of the torque tube 120.

Linkages 150 are connected to the mounts 160 to rotate the solar cell modules 115 about the second axes B. The linkages 150 are attached together in a string aligned substantially parallel to the torque tube 120. The linkages 150 are also connected to each of the mounts 160.

As illustrated in FIG. 2, a linear actuator 190 provides a force to the linkages 150 to move the linkages 150 in first and second directions along the torque tube 120. The linear actuator 190 includes a drive 191 and an extension 194 with a first section 192 and a second section 193. The first and second sections 192, 193 are in a telescoping arrangement with the first section 192 attached to the torque tube 120 and the second section 193 attached to the linkages 150. Activation of the drive 191 moves the second extension 193 into and out of the first extension 192 to adjust the overall length. This movement drives the linkages 150 in first and second directions along the torque tube 120 to rotate the mounts 160 and associated solar cell modules 115 about the axes B. Elongation of the extension 194 causes rotation about the axes B in a first direction, and reduction in the length of the extension 194 causes rotation in a second direction about the axes B. The movement causes the mounts 160 to rotate about the pivot member 165.

The number of linkages 150 in the string that is moved by the linear actuator 190 may vary. According to some embodiments of the present invention, a single linear actuator 190 rotates each of the solar cell modules 115. Other embodiments include two or more linear actuators 190.

According to some embodiments of the present invention, a single linear actuator 190 is positioned on the section 121*a* at an end of the torque tube 120. Other embodiments position the single linear actuator 190 at a central location along the torque tube 120.

The solar cell modules 115 are configured to convert the sunlight into electrical energy. According to some embodiments of the present invention as illustrated in FIG. 2, the solar cell modules 115 are each about 43" by 67". The solar cell modules 115 may include an aluminum frame and plastic or corrugated plastic sides that reduce the overall weight to about 70 pounds. In one embodiment, each solar cell module 115 includes a planar upper surface that includes an array of lenses 140 that are positioned over corresponding receivers. According to some embodiments of the present invention, the modules 115 include a 3×5 array of lenses 140 as illustrated in FIG. 2. Other embodiments may include different numbers and/or arrangements of the lenses 140. In one specific embodiment, the module 115 includes a single lens 140. The lenses 140 may include various shapes and sizes with one specific embodiment including lenses that are about 13" square. Further, the focal length between the lenses 140 and the receivers is about 20". Each receiver may include one or more III-V compound semiconductor solar cells.

When mounted on the surface 300, the torque tube 120 may be positioned in a north N-south S orientation as illustrated in FIG. 1. In one embodiment, the surface 300 is the surface of the Earth. The torque tube 120 includes a length to space a desired number of solar cell modules 115. Throughout the course of the day, the array 100 is adjusted to maintain the solar cell modules 115 facing towards the sun. The drive 170 may be periodically activated to provide a force to rotate the torque tube 120 and hence each of the mounts 160 and attached solar cell modules 115. According to some embodiments of the present invention, the force applied by the drive 170 provides for each of the solar cells receivers 115 to be moved a same amount such that each solar cell array module 115 is synchronized and moved in unison.

In addition to the rotation of the torque tube 120, the one or more linear actuators 190 moves the linkages 150 to further maintain the solar cell modules 115 aligned with the sun. The one or more drives 180 are periodically activated to move the drive linkages 144 and attached string of linkages 150. This movement causes the attached mounts 160 and solar cell modules 115 to pivot about the various axes B. These axes B may be orthogonal to the axis A. The string of linkages 150 provides for each of the solar cell modules 115 to again move in unison about their respective axis B. The movement about both the A and the B axes may allow the solar cell modules 115 to track the elevation and azimuthal position of the sun, although it should be evident that neither a rotational motion along the A axis alone nor along the B axis alone corresponds directly to respective sun position elevation and azimuth angles.

A controller 195 as schematically illustrated in FIG. 1 may control the movement of one or more arrays 100 and the positioning of the modules 115 relative to the sun. The controller 195 may include a microcontroller with associated memory. In one embodiment, controller 195 includes a microprocessor, random access memory, read only memory, and an input/output interface. The controller 195 controls operation of the one or more drives 170 for rotating the torque tube 120 and the solar cell modules 115 about the first axis A. The controller 195 further controls the one or more linear actuators 190 for driving the linkages 150 and rotating the solar cell modules 115 about the second axes B. The controller 195 may include an internal timing mechanism such that the operation of the drives corresponds to the day and the time for the solar cell modules 115 to track the azimuth and elevation of the sun. The controller 195 may be operatively connected to the solar array 100 by one or more hardwire connections (not illustrated) or by a wireless interface.

The kinematic model relates the actuation parameters of the respective motor drives in such manner that the motor drives function to position the array so that the array in pointed at a sun position in the sky represented by the sun elevation and azimuth angles determined by the sun position predictor. In some embodiments, the first and second motor drives are coupled to mechanical components of the array that adjust the elevation and azimuth angle respectively of the array. In other embodiments, the first and second motor drives are coupled to components of the array that changes the roll and pitch motion respectively of the array, with the first motor drive being coupled to a torque tube of the array, and the second motor drive being coupled to a pivot linkage arm of the array. In the latter example, the motor drives may be a linear actuator.

FIG. 3 illustrates a portion of the array of FIG. 1, illustrating the position of the solar cell modules 115 of the array as they are moved by the roll and pitch drive motors to a position so that the array faces the sun during normal tracking operation throughout the course of the day. By the expressions the "array facing the sun" or being "aligned with the sun" in this disclosure, it is meant that the plane of the concentrator lenses 140 is positioned to be orthogonal to the incoming rays of the sun, so that the concentrating lenses 140 direct the impinging sunlight onto a spot on the surface of the respective solar cells in the receiver.

FIG. 4 illustrates three rows of solar cell arrays 100 and a block diagram of the power and control system associated with the arrays. More particularly, there are depicted arrays A, B, and C which are spaced apart over a ground area. The electrical output from each array is connected to a DC to AC converter 404, which connects to the power grid 405. Associated with each array is a current sensor 401, 402, and 403 respectively, which monitors the electrical current being output from each array. The output of the current sensors 401, 402, and 403 is transmitted to a data acquisition unit and recorder 406 for monitoring each of the arrays in the installation and recoding the data in a memory for processing and analysis. The data acquisition unit and recorder 406 is further connected to a controller 407, which in turn is coupled to motor controllers 408, 409, and 410 associated with arrays A, B and C respectively. The controller 407 may further be coupled to a communication link 412 for transmitting operational data to a remote location over telephone lines, the Internet, or other communications channels such as radio or paging signal to a remote operator or central monitoring or power network control location, and/or receiving instructions and operational commands, software updates, and the like from that location.

Figure 5:
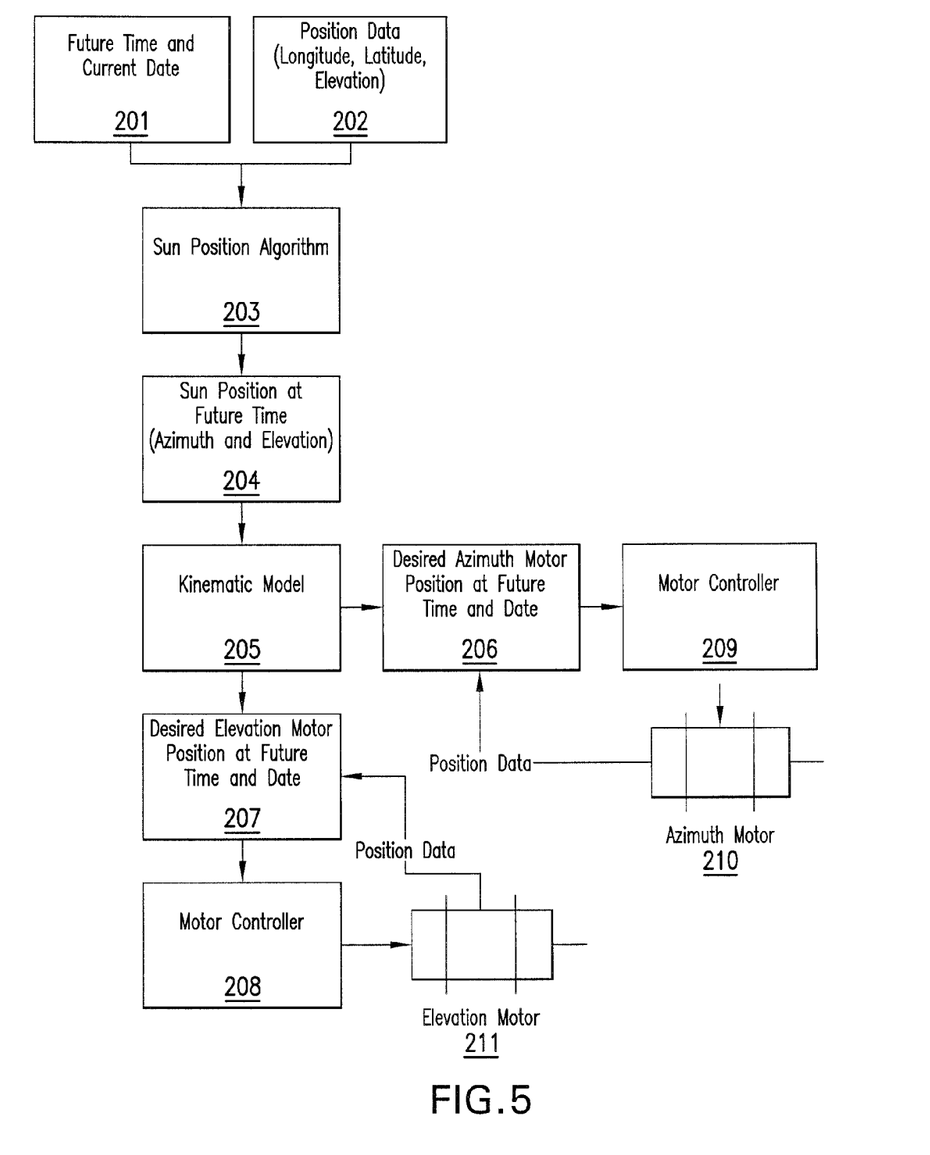
FIG. 5 is a block diagram of the various hardware and software components of the tracking mechanism of the array.

FIG. 5 is a block diagram of the various hardware and software components of the tracking mechanism of the array associated with the controller 407. Based on at least the input data 201, 202, a sun position predictor in the controller 407 in the form of a sun position algorithm 203 calculates and provides the position of the sun (e.g., its azimuth and elevation angles for a particular longitude, latitude, and elevation of the array) at some sequence of "future times" 204 (e.g., a minute by minute time sequence during the course of a particular day during which tracking of the sun by the array is to be executed). In some implementations, the sun position algorithm 203 includes the Solar Position Algorithm (SPA) available from the National Renewable Energy Laboratory (see http://rredc.nrel.gov/solar/codesandalgorithms/spa/ and http://www.nrel.gov/docs/fy08osti/34302.pdf, both of which are incorporated herein by reference), which is executed on a processor on the controller 407.

The sun's azimuth and elevation at the future time 204 are input data to a kinematic model 205, which may be a software program stored in the controller 407. The kinematic model utilizes the sun position at each respective future time 204 in conjunction with the predetermined mechanical drive design of the motor drives to compute the desired corresponding actuation signal (e.g., a digital control signal) to enable movement of the drive shaft and linear actuator of the first and second motor drives, 170 and 190 respectively, such that the modules 115 of the solar cell array 100 are driven so that they are aligned with the sun at the specified future time 201. In some embodiments, we may refer to the first and second motor drives as the roll motor 170 and the pitch motor 190 respectively, or in other embodiments as an azimuth motor 210 and an elevation motor 211, respectively, with the latter being depicted in FIG. 5. As such, the kinematic model 205 enables calculation of the appropriate actuation of the first motor and the second motor so that the solar cell array 100 is aligned with the sun's elevation and azimuth at the future time 204. In some embodiments, each of the motors 210, 211 includes a position encoder that determines the current position of each respective motor (e.g., measured by the rotational position of the drive shaft or linear actuator, represented as an integral number of "counts" or increments of a predetermined numbers of degrees, starting from zero and continuing through 360 degrees for one turn, 720 degrees for two turns, etc.). For control purposes, the position data is fed back to the motor position calculation 206, 207. The position encoder may determine position based on a baseline position corresponding to a level position of the solar panel, such as depicted in FIG. 2. The data of blocks 201-207 can be stored in one or more data stores (e.g., magnetic media, solid state media, or other suitable memory structure). The processing of, e.g., blocks 203 and 205-209 can be performed by, e.g., one or more microprocessors or special- or general-purpose computers in the controller 407.

Figure 6:
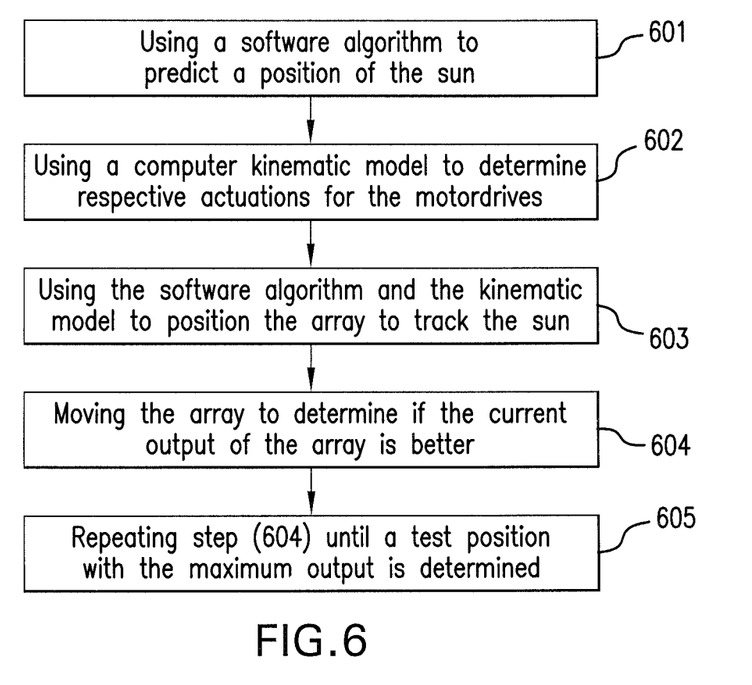
FIG. 6 is a flow diagram of a process for monitoring an output parameter of the solar cell array for determining a set of positions constituting a revised tracking path.
Figure 7:
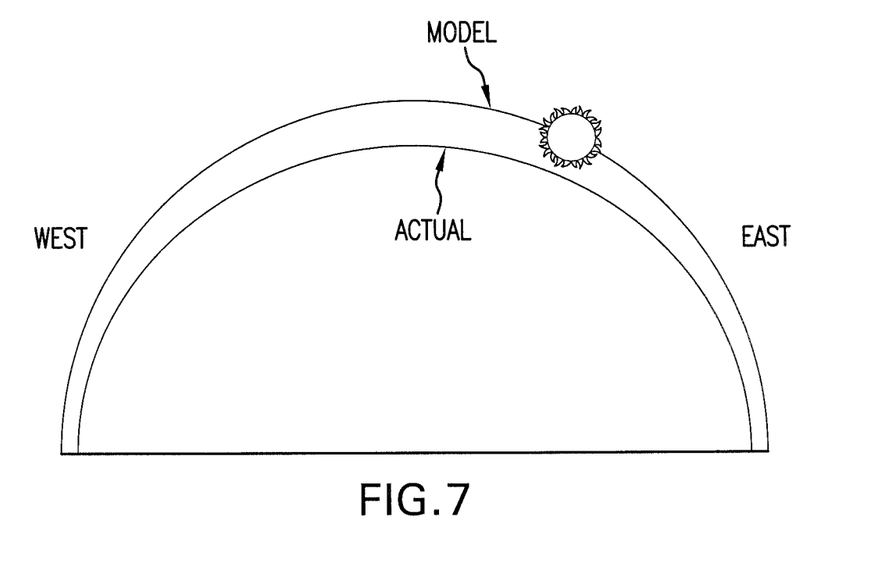
FIG. 7 illustrates the actual path of the sun in comparison with an actual alignment direction resulting from a misaligned solar tracking.

As we have noted above, from time to time, the position and tracking path of the array may deviate occur from the actual path of the sun in the sky, and the array may be said to be "misaligned". These deviations may most typically be due to bending of one or more of the mechanical components of the array (vertical supports, torque tube, frame assemblies, modules, etc.), movement of the ground support or foundation, or warping or misalignment of the optical components, all occurring over the course of time due to normal usage, stress from weather or windstorms, or other environmental factors. FIG. 6 is a flow diagram of a process for monitoring an output parameter of the solar cell array for determining a set of positions constituting a revised tracking path, as discussed in greater detail in the various related applications noted above. In one embodiment, the method includes the sequence of steps 601 through 605. First, as shown in block 601, a software algorithm is used to predict a position of the sun at a sequence of times after sunrise based, at least in part, on latitude, longitude and elevation. As shown in block 602, a computer kinematic model is used to determine respective actuations for the motor drives corresponding to the solar cell array being substantially aligned with and tracking the position of the sun during the course of the day. As shown in block 603, input from the software algorithm and the kinematic model are used to activate the respective motors to position the array over a time period so that the array follows a predetermined path to track the sun (as predicted by the model) during the course of the day. As shown in block 604, the output of the array is periodically sampled at sun position p and moving the array according a predetermined test movement algorithm to seek out a new position $p_i'$ (where i=1 through n) at the test time $t_i$ (where i=1 through n) that results in a higher current (or power) output. If, as suggested in FIG. 7, the position of the array (designated by the track labeled "actual") is not accurately tracking where the sun actually is in the sky, a new position $p_i'$ (where i=1 through n) of the array is found with higher power output. (The new position corresponding to a more accurate alignment with the sun). The tracking data in the database could then be reset so that the position of the array at the test time is change from position p to the new sun position $p_i'$ (where i=1 through n).

As a result, repeating the process over a sequence of times during the course of the day, the actual tracking path of the array is modified so that the array more accurately tracks the sun and increases the power output. One or more examples of the process of periodically sampling the output of the array with various types of sampling movements have been described in various ones of the parent applications U.S. patent application Ser. No. 12/619,322, filed Nov. 16, 2009; Ser. No. 12/498,135, filed Jul. 6, 2009; and Ser. No. 12/468,747, filed May 19, 2009.

Moreover, optionally, in order to increase accuracy, as shown in block 605, the step shown in block 604 may be repeated until the position $p_x'$ with the maximum output at the test time is determined. The sequence of new sun positions $p_i'$ (where i=1 through n) is then stored in a database in a memory.

As noted above, FIG. 7 illustrates in a highly schematic manner the actual path of the sun (labeled "model") in comparison with the actual tracking path of the array resulting from mechanical or foundational changes that result in a deviation from the expected motion of the array 100.

Figure 8:
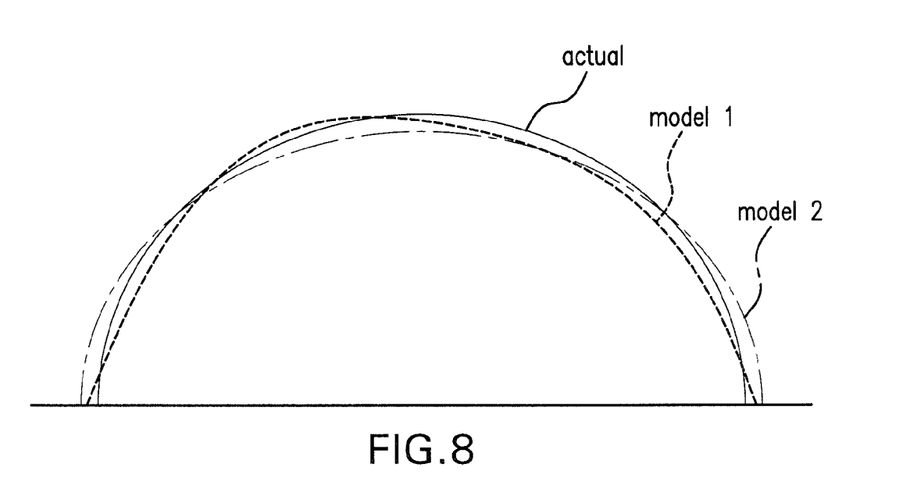
FIG. 8 illustrates the actual path of the sun in comparison with the tracking path of two different kinematic models.

FIG. 8 illustrates the actual path of the sun (as determined from the testing routine of FIG. 6) in comparison with examples of computed model paths (model 1, model 2) when the parameters of the kinematic models have been modified.

Figure 9:
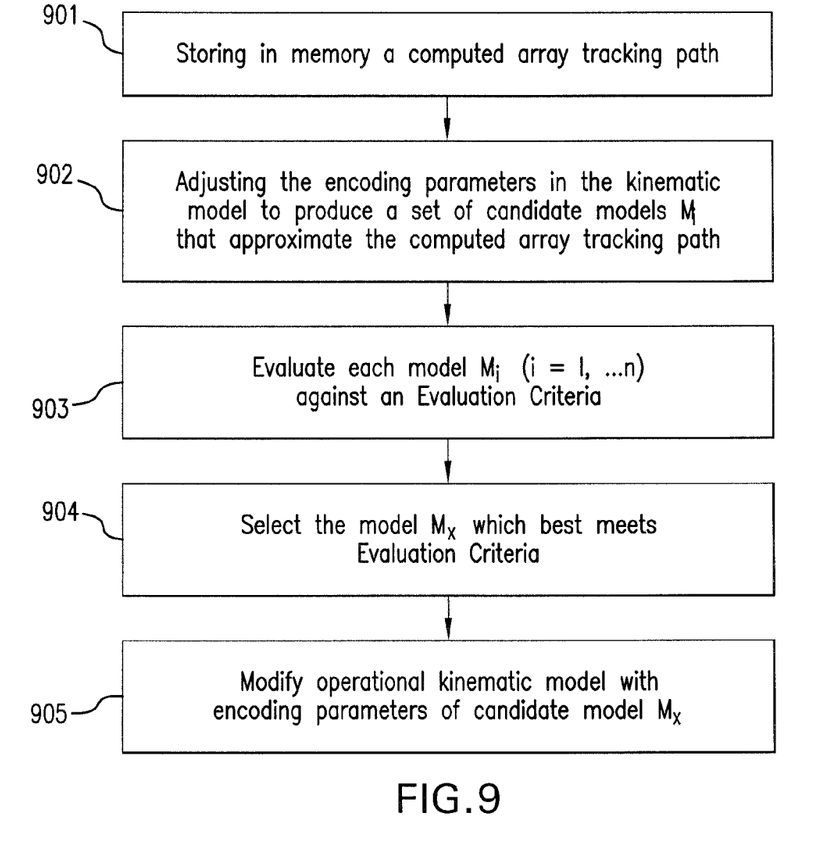
FIG. 9 is a flow diagram of a process for modifying the kinematic model of the solar cell array for defining a revised tracking path.

FIG. 9 is a flow diagram of a process for modifying the kinematic model of the solar cell array for defining an initial or a revised tracking path. The kinematic model relates the actuation parameters of the respective motor drives in such manner that the motor drives function to position the array so that the array in pointed at a sun position in the sky represented by the sun elevation and azimuth angles determined by the sun position predictor.

In one embodiment, the step of adjusting the parameters of the kinematic model is performed after initial installation of the array. In other embodiments, the step of adjusting the parameters of the kinematic model is performed after a determination has been made that the array requires realignment.

In one embodiment, the method includes the sequence of steps 901 through 905. First, as shown in block 901, in some implementations, a sequence of new sun positions $p_i'$ (where i=1 through n) that specify the position of the sun at a sequence of times after sunrise during the course of the day for the specific array under consideration is stored in a database in a memory of the controller 407, as a result of the operations shown in FIG. 6. In other implementations, for example, in an initial alignment after installation of the array, the sequence of new sun positions may be specified by the Solar Position Algorithm (SPA) noted above.

Next, as shown in block 902, a software routine adjusts the encoding parameters in the kinematic model to produce a set of candidate models $M_i$ (where i=1, n) that approximate the computed array tracking path. In some embodiments, the encoding parameter is a digital signal representing the number of shaft revolutions of at least one of the motor drives. In some embodiments, the encoding parameter is a digital signal representing the displacement of the linear actuator motor drive.

In order to update and adjust the kinematic model to conform to the new sun positions, in some embodiments an adjustment software routine is executed in the controller 407 that varies each of the parameters of the kinematic model in a positive or a negative increments, and assesses whether the model is better as the parameters are varied one way or the other. After an iterated sequence of such evaluations, there is formed a group or list of different test or candidate kinematic models $M_i$ (where i=1, n) that result different tracking paths over the range of sun positions that approximate the actual path, as illustrated in FIG. 8. In some embodiments, the step of adjusting the parameters of the kinematic model may be performed by downloading instructions from a remote location to the controller 407.

Next, as shown in block 903, a software routine assesses each of the test kinematic models $M_i$ (where i=1, . . . n) against a predetermined evaluation criteria (such as a "best fit" curve, or minimum of the errors as summed over each of the sun position points) as the kinematic model simulates a progression through the range of sun positions during the course of the day.

As shown in block 904, a decisional model software routine selects one of the test or candidate kinematic models that best meets the evaluation criteria. Once the test or candidate kinematic model is selected, the operational kinematic model of the array is then adjusted to conform to the parameters of the selected test kinematic model, as shown in block 905, so that subsequently the motion of the array at predetermined times during the course of the day tracks the set of reset positions $p_i'$ (where i=1 through n) with the maximum output of the array.

To stay properly aligned with the sun during solar tracking during the course of operation over an extended period of time (e.g. many days or months, if not longer), in one embodiment the terrestrial solar tracking system may perform an alignment testing routine periodically (e.g. monthly) to assess the alignment of the array and correct any misalignment relative to the sun. The alignment testing routine may be also initiated manually by a user operation, by a command signal from a remote location through the communication link 412, or automatically by the controller 190 based on a triggering event, which may be a sensed event or a predetermined time. As discussed hereafter, the alignment testing routine moves the solar cell modules off a current position in the roll and/or pitch directions while measuring (e.g., "scoring") the performance (i.e., the output current or power) of a cluster of four solar cell modules 115, and analyzes the measured performance data (against historical data, or data from other arrays taken at the same time and in the same location).

In this embodiment, the alignment testing routine separately increments the roll position and the pitch position for a solar cell array and monitors the output current and/or power of the solar cell array. (For simplicity, we may also use the term "power" herein although either the parameter of current or power may actually be measured).

In one embodiment, monitored data from one solar cell array is used to adjust the tracking for that array. This allows one or a smaller number of solar cell modules 115 to be individually mechanically adjusted, if need be, through the delta ranges on pitch, with respect to the position of other solar cell modules in the array. This could also be useful in that at a given time certain solar cell modules 115 may be in direct view of the sun and thus more useful in monitoring performance than solar cell modules under cover of cloud and blocked from direct sunlight.

The output parameter can be the normal output parameter measured for the solar cell module 115, for example, the output current or the output power. Typically, during illumination the arrays constantly produce current, and therefore it is straightforward to provide electrical taps at the module level, the cluster level, or the array level, to capture and measure the produced current associated with any one module, cluster or array, and transmit such parameters to a system monitor for real time performance monitoring and analysis, or to data storage, so that the data can be accessed at a future time for analysis. The frequency with which the data is analyzed for alignment can vary, and can be at automatic intervals or up from automatic or manual triggering events. The techniques may be executed automatically each day, each week, each month, or seasonally. Of course, these are by way of example, as the techniques may be executed more frequently as well, for example.

The system may consider numerous factors for measuring output parameter data. In fact, such factors can be used to determine when to initiate the alignment testing routine altogether, i.e., whether the output parameter data should be analyzed in the first instance. Other factors may be used to determine whether to execute alignment adjustment of the solar cell array based on the measured output parameters. For example, a decisional model may be used that analyzes power measured by the solar cell array and considers whether there has been a sudden drop in power that suggests a re-alignment is needed (such as a result of a wind storm or ground shift) or a sudden drop that does not (such as a cloud moving between the sun and array). Other factors may include the average power measured over the day while solar tracking, historical data from previous, similar tracking periods (e.g., the day before, a similar day the year before, etc.). In any event, the decisional model may consider all such relevant factors in determining whether to actually analyze the measured parameter and determine whether a measured value suggests that alignment is needed or not.

The algorithms are example applications of the monitored data measured by the system. These algorithms can be initiated manually by operator initiation or automatically, such as at predetermined intervals or at specifically determined events such as at start up. Other triggering events include a sudden decrease in a measured output parameter, which may indicate that the solar tracking routine is not aligned, or more slowly varying errors such as currently measured output parameters that are smaller in value than previous measurements from the same measurement period.

In an alternative embodiment, instead of measuring the power at incremented and decremented positions relative to the set position, the alignment testing routine may monitor the power and measure the positions on either side of the set position at which a certain percentage drop in power has occurred for both the roll position and the pitch position. The maximum power position may then be determined by calculating the midpoint between the two measure positions. Again, the process is repeated in an iterative manner if the power at the maximum power position is greater than the power at the set position.

The delta values discussed may or may not be fixed. The same adjustment values may be made for pitch and roll in some examples. But in others the adjustment values will be different. These values may be static, that is, a fixed angle. In other examples, the amount of adjustment may be determined by the actual monitored output parameter. Typically, the delta values will be less than 5°.

In addition to triggering based on sudden decreases, the algorithms may be triggered by accumulated decreases over time, such as a continuous unexplained decrease in output power.

While in the embodiments discussed above, the power performance of the solar cell array is monitored, in alternative embodiments the position of the solar cells could be directly monitored. Separate sensors could be used to measure the position of the longitudinal or vertical supports, for example, to measure against beam twisting or sagging. In response to a threshold value being reached, a warning signal could be output to an operator through the communications interface. Other examples are described herein and yet others will now become apparent to persons of ordinary skill in the art.

The above embodiments have been described in the context of a terrestrial solar power system in which a plurality of solar cell arrays are mounted in a spaced configuration along a longitudinal support for rotation in tandem about an axis A generally aligned with the longitudinal support, and with each array also being rotatable about a respective axis B generally orthogonal to the longitudinal support. A skilled person will recognize that the monitoring techniques described above can be used with other configurations of solar power system. For example, the monitoring techniques could be used with a terrestrial solar tracking system having an array of solar cell modules mounted on a single tower, with the array of solar cell modules being adjustable in the azimuth direction and the elevation direction in order to track the sun.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

A number of implementations have been described. Nevertheless, it will be understood that various modifications may be made without departing from the spirit and scope of the invention. Accordingly, other embodiments are within the scope of the claims.

What is claimed is:

1. An automated method of causing a photovoltaic solar cell array of a terrestrial solar cell system to track the sun, the system comprising two motor drives each of which is operable to adjust a position of the array along a different respective axis with respect to the sun, the method comprising:
   (a) using a sun position predictor to predict a position of the sun in the sky at a time after sunrise based, at least in part, on the latitude, longitude and elevation of the array;
   (b) using a computer kinematic model to determine respective actuations for the motor drives corresponding to the solar cell array being substantially aligned with the sun during the course of the day, the kinematic model including encoding parameters;
   (c) using the sun position predictor and the kinematic model to position the array so that the array is aligned to follow a predetermined track corresponding to the predicted position of the sun during the course of the day;
   (d) periodically sampling the output of the array during the course of the day at sun position $p_i$ (where i=1 through n), and resetting the position of the array to a new sun position $p_i'$ (where i=1 through n) that results in an increase in the output of the array at that position;
   (e) storing the sequence of new sun positions $p_i'$ (where i=1 through n) corresponding to the track of the array during the course of a day in a memory;
   (f) adjusting the parameters of the kinematic model to form a list of test kinematic models over the range of sun positions;
   (g) evaluating each of the test kinematic models against a predetermined evaluation criteria as they simulate a progression through the range of sun positions during the course of the day;

(h) selecting one of the test kinematic models that best meets the evaluation criteria; and (i) modifying the operational kinematic model of the array to conform to the parameters of the selected test kinematic model, so that subsequently the motion of the array at predetermined times during the course of the day tracks the set of reset positions with maximum output.

2. An automated method as defined in claim 1, wherein the encoding parameter is a digital signal representing the number of shaft revolutions of at least one of the motor drives.

3. An automated method as defined in claim 1, wherein the kinematic model relates the actuation parameters of the respective motor drives in such manner that the motor drives function to position the array so that the array is pointed at a sun position in the sky represented by the sun elevation and azimuth angles determined by the sun position predictor.

4. An automated method as defined in claim 1, wherein the first and second motor drives are coupled to mechanical components of the array that adjust the elevation and azimuth angle respectively of the array.

5. An automated method as defined in claim 1, wherein one of the motor drives is a linear actuator.

6. An automated method as defined in claim 1, wherein the first and second motor drives are coupled to components of the array that change the roll and pitch motion respectively of the array.

7. An automated method as defined in claim 6, wherein the first motor drive is coupled to a torque tube of the array.

8. An automated method as defined in claim 6, wherein the second motor drive is coupled to a pivot linkage arm of the array.

9. An automated method as defined in claim 1, wherein the array is a flat panel.

10. An automated method as defined in claim 1, wherein the output of the array which is sampled is the electrical current.

11. An automated method as defined in claim 1, further comprising computing a new track if the output of the array is less than a predetermined percentage of one or more of the adjoining arrays.

12. An automated method as defined in claim 1, further comprising communicating the output of the array to a remote monitor if the output of the array is less than a predetermined percentage of one or more of the adjoining arrays.

13. An automated method as defined in claim 1, wherein communicating the output of the array to a remote monitor is performed by transmitting a radio paging signal.

14. An automated method as defined in claim 1, wherein the step of adjusting the parameters of the kinematic model is performed after initial installation of the array.

15. An automated method as defined in claim 1, wherein the sun position predictor is a software algorithm, and the sun position predictor and the computer kinematic model are stored in a controller which is electrically connected to the array.

16. An automated method as defined in claim 1, wherein the step of adjusting the parameters of the kinematic model is performed by downloading instructions from a remote location to a controller which is electrically connected to the array.

17. An automated method as defined in claim 1, wherein the evaluation criteria is minimizing the least square errors.

18. An automated method as defined in claim 1, wherein the evaluation criteria is a best curve fit.

19. An automated method as defined in claim 1, wherein the photovoltaic solar cell array includes:
   first and second vertical supports that each include a first end mounted on a support surface and a second end;
   a longitudinal support mounted on the second end of said first and second vertical supports respectively, and longitudinally extending between said supports over the surface of the earth, wherein the first motor drive is operatively connected to the longitudinal support to rotate the longitudinal support along its axis during the course of a day; and
   a plurality of solar cell modules pivotably coupled to the longitudinal support and spaced along a length of the longitudinal support to track the azimuth and elevation of the sun during the course of the day; wherein the second motor drive is coupled to the modules to simultaneously rotate the modules along an axis substantially orthogonal to the axis of said longitudinal support.

20. An automated method as defined in claim 1, wherein the solar cell module includes:
   a housing comprising a first side and an opposing spaced-apart second side;
   a plurality of lenses on the first side of the housing;
   a plurality of solar cell receivers on the second side of the housing, each of the plurality of solar cell receivers comprising:
   a III-V compound semiconductor multijunction solar cell including a first surface and a second surface;
   a bypass diode coupled with the solar cell;
   a heat sink positioned below the second surface of the solar cell and thermally coupled to the solar cell;
   at least one optical element positioned above the first surface to guide the light onto the solar cell;
   each of said solar cell receivers being disposed in an optical path of one of the plurality of lenses, wherein the lens and the at least one optical element concentrate the light onto the respective solar cell by a factor of 500 or more to generate in excess of 25 watts of peak power.

* * * * *